(12) United States Patent
Groeneweg et al.

(10) Patent No.: US 8,393,468 B2
(45) Date of Patent: Mar. 12, 2013

(54) SYSTEM FOR PACKAGING FLOWERS PURCHASED ON THE INTERNET

(75) Inventors: Bastiaan Rinke Anthony Groeneweg, Rockanje (NL); Paulus Josephus Benedictus Maria Van De Loo, Klaaswaal (NL)

(73) Assignee: 'T Groene Loo BV (NL)

( * ) Notice: Subject to any disclaimer, the term of this patent is extended or adjusted under 35 U.S.C. 154(b) by 458 days.

(21) Appl. No.: 12/707,905

(22) Filed: Feb. 18, 2010

(65) Prior Publication Data
US 2010/0139164 A1 Jun. 10, 2010

Related U.S. Application Data

(62) Division of application No. 11/673,738, filed on Feb. 12, 2007, now Pat. No. 7,725,361.

(51) Int. Cl.
*B65D 85/50* (2006.01)
(52) U.S. Cl. ........ 206/423; 206/770
(58) Field of Classification Search .......... 206/423, 206/438, 778, 770, 525, 526, 521.2
See application file for complete search history.

(56) References Cited

U.S. PATENT DOCUMENTS

| 2,039,442 | A | * | 5/1936 | Mulford | 47/73 |
| 2,348,488 | A | * | 5/1944 | McLellan et al. | 312/31 |
| 2,358,295 | A | * | 9/1944 | Bacigalupi | 206/423 |
| 3,660,934 | A | * | 5/1972 | Pollack et al. | 47/84 |
| 5,217,117 | A | * | 6/1993 | Tsuji | 206/423 |
| 7,725,361 | B2 | * | 5/2010 | Groeneweg et al. | 705/26.81 |
| 2005/0199523 | A1 | * | 9/2005 | Weder | 206/423 |

FOREIGN PATENT DOCUMENTS

FR 2614608 A1 * 11/1988

* cited by examiner

*Primary Examiner* — David Fidei
(74) *Attorney, Agent, or Firm* — Hartman Global IP Law; Gary M. Hartman; Domenica N. S. Hartman

(57) ABSTRACT

A method and system suitable for ordering, packaging, and delivering harvested plants, such as fresh-cut flowers. The method and method entail placing an order for harvested plants by selecting at least one plant varietal, identifying a recipient for the plant by name and address, indicating a date for the recipient to receive the plant, and optionally creating a message to be delivered with the plant to the recipient. The plant is then placed in at least one recess within a transparent shell comprising a raised peripheral edge that surrounds and defines the recess. The shell and plant are then placed in a transparent enclosure formed from a perforated transparent foil, and the enclosure and a shipping label are then inserted in a shipping container that is at least translucent to enable the plant and the label to be visible therethrough.

19 Claims, 5 Drawing Sheets

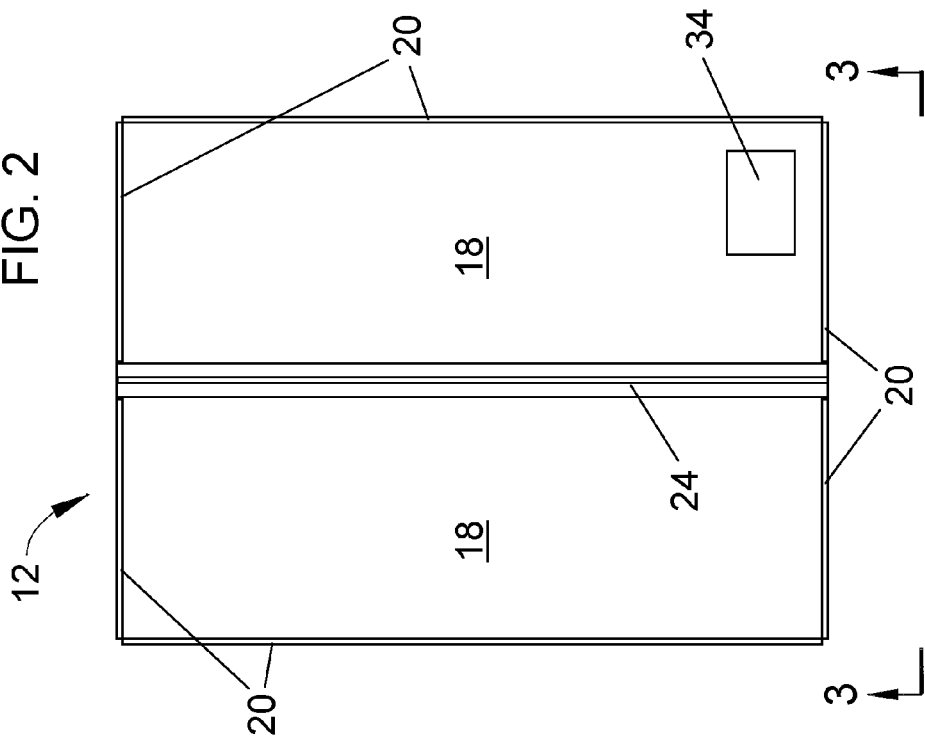
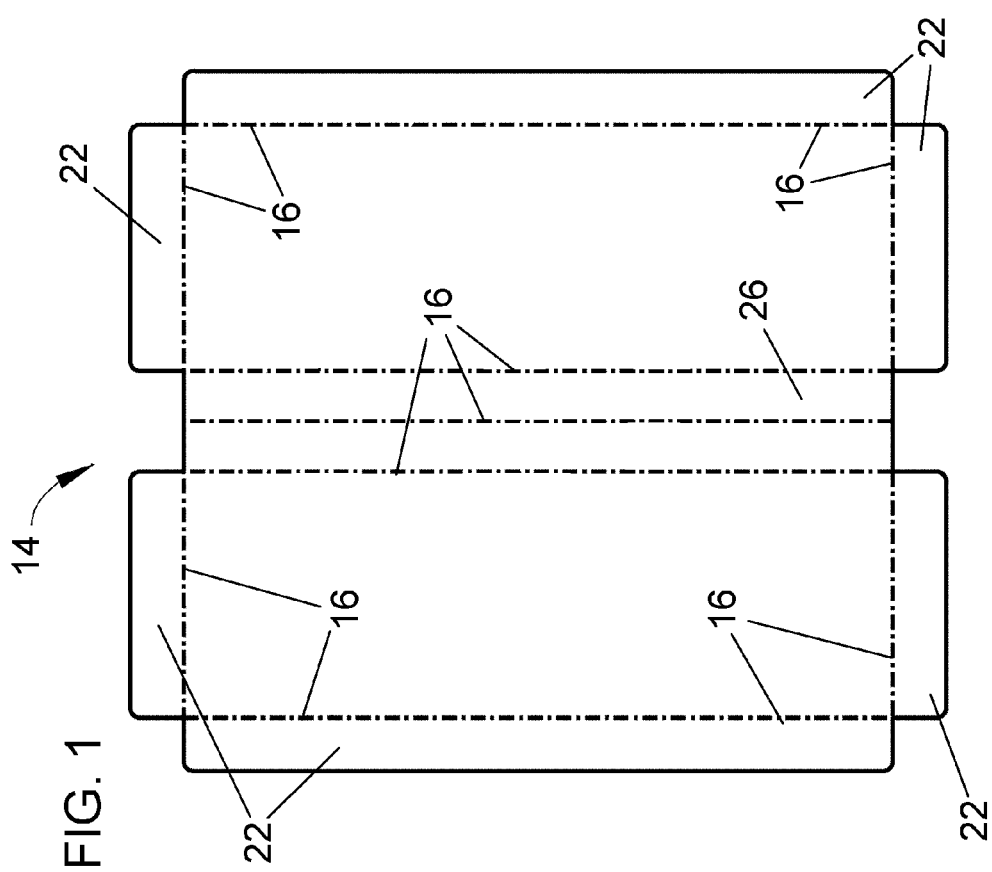

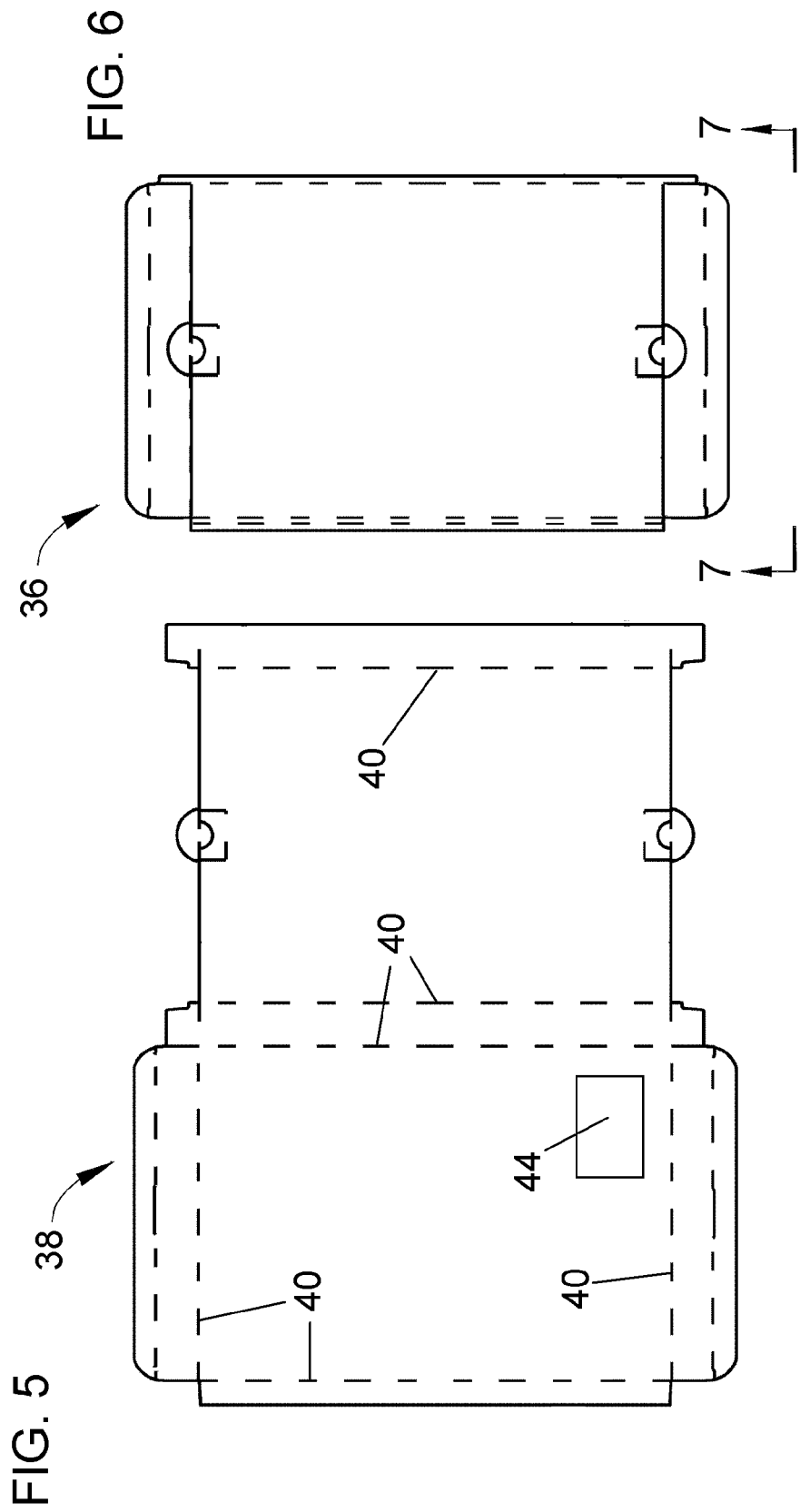

SYSTEM FOR PACKAGING FLOWERS PURCHASED ON THE INTERNET

This is a division patent application of co-pending U.S. patent application Ser. No. 11/673,738, filed Feb. 12, 2007.

BACKGROUND OF THE INVENTION

The present invention generally relates to methods and systems for packaging and delivering flowers and other harvested plants. More particularly, this invention relates to a system and method for ordering, packaging and delivering flowers, etc., via a postal service.

Various packaging methods are known for harvested plants, such as fresh-cut flowers. If delivery is by postal service or otherwise other than being immediately delivered by hand, a challenge faced by the supplier is the need to maintain the appearance and freshness of the plant for the duration of the shipping process, as well as for an extended time after shipping. Finally, the presentation of the plant is also important if intended as a gift for the recipient.

BRIEF SUMMARY OF THE INVENTION

The present invention provides a method and system suitable for ordering, packaging, and delivering harvested plants, such as fresh-cut flowers.

The method of this invention includes placing an order for one or more harvested plants by selecting at least one plant varietal, identifying a recipient for the harvested plant by name and address, indicating a date for the recipient to receive the harvested plant, and optionally creating a message to be delivered with the harvested plant to the recipient. A document is then generated on which is printed an order identification information associated with the order, product identification information corresponding to the plant varietal, shipping data comprising the name and address of the recipient, and optionally the optional message. The harvested plant is then placed in at least a first recess within a transparent shell comprising a raised peripheral edge that surrounds and defines the first recess. The shell and harvested plant are then placed in a transparent enclosure formed from a perforated transparent foil. The transparent enclosure and the document are then inserted in a cavity within a shipping container that is at least translucent to enable the harvested plant and the document to be visible therethrough. The cavity has a cross-sectional size and shape corresponding to the cross-sectional profile of the transparent shell. Finally, the shipping container and its contents are shipped to the intended recipient.

The system of this invention includes a transparent shell adapted for receiving a harvested plant, a transparent enclosure sized and configured for enclosing the shell and the harvested plant, and a shipping container comprising a cavity that is sized and configured for accommodating the transparent enclosure with the shell and the harvested plant therein. The transparent shell comprises a raised peripheral edge that surrounds and defines at least a first recess sized and configured for accommodating the harvested plant. The transparent enclosure is formed from a perforated transparent foil. The shipping container is at least sufficiently translucent to enable the harvested plant to be visible therethrough, and the cavity defined by the container has a cross-sectional size and shape corresponding to the cross-sectional profile of the transparent shell.

In view of the above, the present invention provides a convenient and uncomplicated process for ordering and shipping harvested plants such as cut flowers. Notably, the packaging system is able to comply with so-called "letterbox standards" (for example, up to about 40×2000×450 mm) such that the delivery of cut flowers using the method and system of this invention can be considerably less expensive than by special delivery couriers. Furthermore, a significant advantage of this invention is that the method and system are adapted to maintain the appearance and freshness of the plant for the duration of the shipping process, as well as for an extended time after shipping. Finally, the transparency of the shell, enclosure, and shipping container enable the presentation of the plant to be visually pleasant to the recipient.

Other objects and advantages of this invention will be better appreciated from the following detailed description.

BRIEF DESCRIPTION OF THE DRAWINGS

FIG. 1 is a plan view of a shell adapted for being folded to contain flowers in accordance with a preferred embodiment of this invention.

FIGS. 2 and 3 are plan and end views, respectively, of the shell of FIG. 1 in a folded condition in preparation for receiving flowers in accordance with the preferred embodiment of this invention.

FIG. 5 is a plan view of a container preform prior to being folded to form a shipping container adapted to receive and contain the shell of FIGS. 2 and 3 in accordance with a preferred embodiment of this invention.

FIGS. 6 and 7 are plan and end views, respectively, of the shipping container formed by folding the preform of FIG. 5 in accordance with the preferred embodiment of this invention.

DETAILED DESCRIPTION OF THE INVENTION

A system and method for ordering, packaging, and delivering flowers or other harvested plants via regular postal service is represented in FIGS. 1 through 9. For convenience, the following discussion will primarily focus on the ordering, packaging, and delivery of fresh cut flowers, though it should be understood that the invention is not limited to flowers. Furthermore, the invention will be discussed in particular reference to placing orders through the Internet, though other modes of placing orders are also within the scope of the invention.

Figure 9:
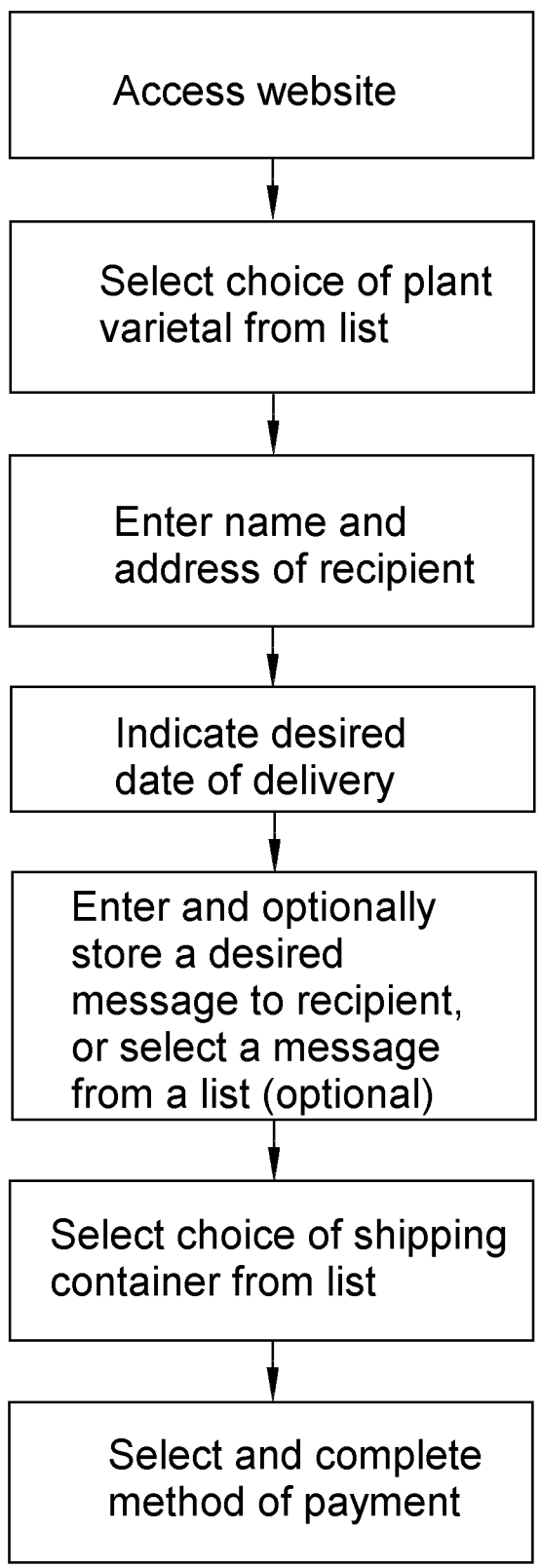
FIG. 9 is a flowchart representing the primary steps in carrying out a method for ordering harvested plants in accordance with the invention.

As represented in FIG. 9, an individual (hereinafter, customer) places an order through a series of options screens accessed through an Internet website. At the website, the customer is prompted to indicate the number and choice or choices of flower varietals desired, the name and address of the intended recipient, a desired date for delivery, and optionally a personal message to be sent with the flowers. The message can be selected from a list of standard messages offered by the website, or can be created and entered by the customer. The website can also offer the option of storing the message to allow the customer to send the same message to any number of different recipients. Another desirable option is to allow the customer to select a shipping package 10 (discussed in more detail below with reference to FIGS. 1 through 8) from a list of different packages that may be available. For example, the customer may be allowed to select a package 10 produced to have a particular decorative pattern.

After completing the above, the customer is prompted to select and complete a method of payment. The details of the order are then preferably recorded on an order document (paper or other suitable recording medium) that preferably includes order identification information (such as an order number associated with the transaction), product identification information corresponding to the flower varietal (such as with codes associated with the offered varietals), shipping data including the shipping date and the name and address of the recipient, and optionally the message for the recipient. The document may be in a suitable form to be inserted in the shipping package 10 so that the name and address of the recipient are visible. For example, and as discussed below, the shipping package 10 may be formed to have a transparent window so that the recipient's address is visible, whereas the personal message is not visible through the window.

Figure 3:
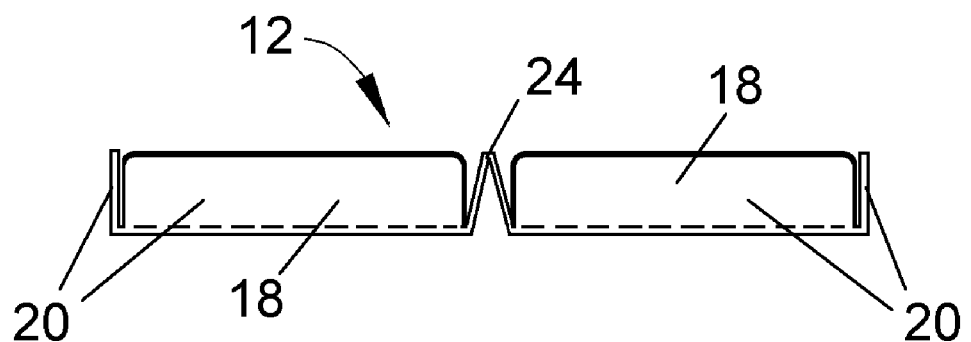

The flowers selected by the customer are preferably harvested according to a specified length, for example, about thirty-four centimeters. Selection is typically on the basis of maturity and head size (e.g., a maximum of about 22 mm). Immediately after harvest, the flower stems are preferably immersed in water and rapidly cooled in a dry cold room, such as to a temperature of about 5 EC. Thereafter, the flowers are placed in a transparent shell 12 represented in FIGS. 2 and 3. FIG. 1 is a plan view of a preform 14 from which the shell 12 can be formed by bending the preform 14 along the dashed lines 16 depicted in FIG. 1. The shell 12 is represented in FIGS. 2 and 3 as defining two recess 18, though a single recess or additional recesses could also be provided. As evident from FIGS. 1 through 3, the recesses 18 are defined as a result of the folding operation producing a segmented raised peripheral edge 20 from tabs 22 extending at the periphery of the preform 14, such that the peripheral edge 20 surrounds and defines the recesses 18. The recesses 18 are further defined and separated by a divider 24. As evident from FIG. 3, from which the cross-sectional profile of the shell 12 can be seen, the divider 24 has an inverted V-shape as a result of being formed by folding an interior section 26 of the preform 14. Each recess 18 has a size and shape to accommodate the flowers purchased by the customer, preferably such that the heads of the flowers are spaced about one centimeter from a peripheral edge 20 of the shell 12 when the cut ends of the flower stems contact the opposite peripheral edge 20. The shell 12 and each recess 18 preferably has a rectilinear outline as seen in the plan view of FIG. 2, and the shell 12 and recesses 18 each generally have a rectilinear cross-sectional profile as seen in FIG. 3. From FIG. 3, it can also be seen that the peripheral edge 20 and the divider 24 have roughly the same height.

As indicated above, the shell 12 is preferably transparent. For this purpose, a suitable material is transparent polypropylene, for example, having a thickness of about 750 micrometers, though other materials of suitable transparency could be used. In addition to allowing the flowers to remain visible through the shell 12, the transparency of the shell 12 permits a shipping label 34 (such as can be made from the order document discussed above) to be applied to the interior of the shell 12 and yet be visible from the exterior of the shell 12. For example, the shipping data can be visible through the wall of the transparent shell 12, while the personal message of the order document faces and is visible from the interior of the shell 12.

As evident from FIGS. 2 and 3, the recesses 18 enable flowers (not shown) to be arranged flat within the shell 12 so that damage to the flowers is significantly minimized. In particular, the raised peripheral edge 20 and divider 24 provide stiffness and sturdiness with minimal weight, resulting in a shell 12 whose size and shape are well suited for delivery by mail. In combination with a transparent enclosure 28 shown in FIG. 4, the recesses 18 also serve to minimize the amount of air that will be contained with the final packaging 10. The enclosure 28 is preferably formed from a transparent foil 30 in which perforations 32 are present. In accordance with known foil materials for packaging fresh produce, the foil 30 is preferably formed of a gas impermeable material or is laminated to include a gas impermeable layer so that, aside from the perforations 32, the enclosure 28 provides a barrier to gas exchange with the flowers within the shell 12. Also in accordance with known practices, the interior surface of the foil 30 is preferably formed by a laminated film (not shown) that inhibits condensation within the enclosure 28. This latter aspect is primarily for aesthetic reasons, so that the enclosure 28 doesn't develop a mist on its surface at the moment the package 10 is opened by the recipient.

As a result of the gas impermeable foil 30 preventing oxygen from entering the enclosure 28 other than through the perforations 32, the oxygen content within the package 10 can be very accurately controlled through the size and number of perforations 32. An optimum size and number of perforations 32 will generally depend on the type, temperature, and number of flowers within the enclosure 28. As such, suitable numbers and sizes for the perforations 32 can be ascertained through an understanding of the respiration of the flower types being shipped and through routine experimentation. The number and size of the perforations 32 is also highly dependent upon the expected outside temperature during delivery, i.e., the weather forecast for the time during which delivery will occur, as the respiration of the flowers is intended to ensure that an ideal level of oxygen (about 6 to about 10 volume percent, depending on flower varietal) is reached within the package 10. With increasing temperatures, flowers have a higher degree of respiration, and the number of perforations 32 should be increased to avoid excessively low oxygen levels within the package 10 which, if allowed to occur, will result in anaerobic respiration within the package 10 and the production of ethanol that can inhibit blooming. Taking the above into consideration, it is believed that an optimum number of perforations 32 for most flowers will be within a range of one to about fifty, whereas a suitable size for the perforations 32 will generally be within a range of about 50 to about 250 micrometers in diameter.

Figure 4:
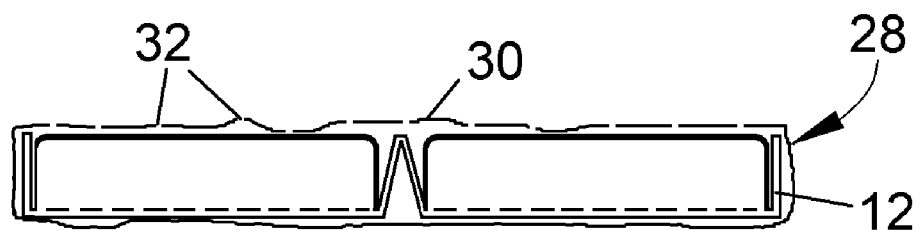
FIG. 4 is an end view of the shell of FIGS. 2 and 3 enclosed within a perforated foil that inhibits condensation and provides a high gas barrier for flowers placed in the shell in accordance with the preferred embodiment of this invention.
Figure 7:
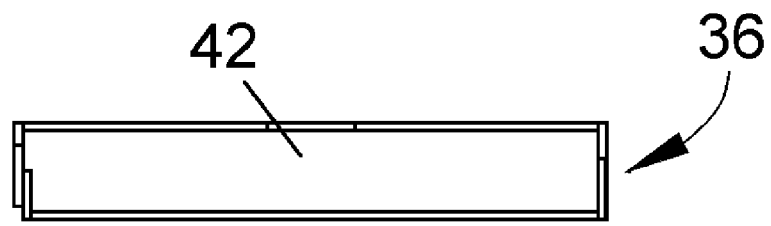

As evident from FIG. 4, the perforations 32 are preferably limited to the regions of the foil 30 that overlie the flowers within the recesses 18, such that perforations 32 are not present in the regions of the foil 30 that lie against and contact the exterior of the shell 12. Suitable processes for forming the perforations 32 in the foil 30 include punching and laser machining, with a preferred process making use of an online laser commercially known as the PerfoTec Online Laser Perforation System®, which was developed by PerfoTec BV for packaging fresh produce.

During or immediately prior to placement of the shell 12 and flowers within the foil 30 and sealing the foil 30 to form the enclosure 28, pressurized air is preferably directed into the foil 30, such as with a pressure sponge or a blower, to control the amount and quality of air in the enclosure 28. This step is useful to rapidly achieve a desired level of oxygen in the enclosure 28 and facilitate insertion of the shell 12 and its flowers within the enclosure.

Figure 8:
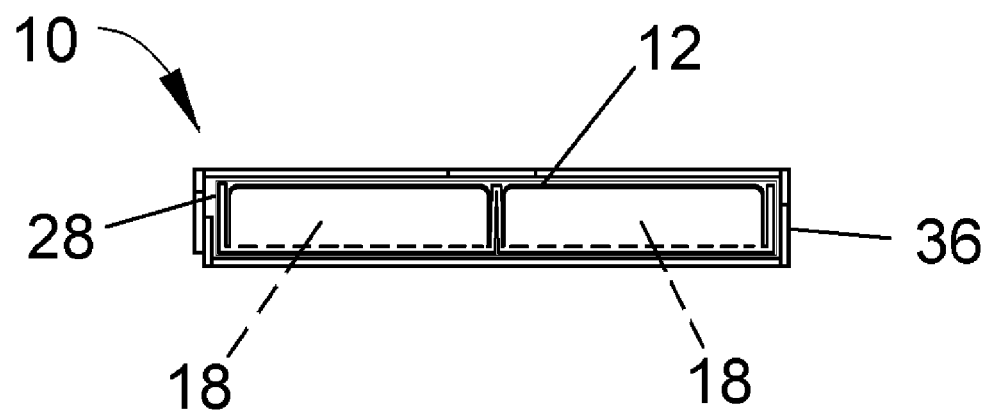
FIG. 8 is an end view of a shipping package, formed by inserting the enclosed shell of FIG. 4 in the shipping container of FIGS. 5 and 6.

Finally, the enclosure 28 containing the shell 12 and flowers is inserted in a shipping container 36 (FIGS. 6 and 7), which forms the exterior of the shipping package 10 (FIG. 8). As with the shell 12, the container 36 is transparent or at least sufficiently translucent to enable the flowers and shipping label 34 to be visible from the exterior of the package 10. For this purpose, a suitable material for the container 36 is again transparent polypropylene with a thickness of about 750 micrometers. The interior or exterior surface of the container 36 can be imprinted with a pattern (not shown) to provide a decorative appearance to the package 10. If such a pattern is present, at least a region 44 of the container 10 aligned with the shipping label 34 is preferably transparent so that the shipping label 34 is not obscured. Also similar to the shell 12, the container 36 is preferably fabricated from a preform 38, shown in FIG. 5 as having fold lines 40 along which the preform 38 is folded to form the container 36. The container 36 can be held together by adhesive or interlocking tabs to create a rectilinear interior cavity 42 whose shape in cross-section and outline correspond to that of the shell 12, with its size slightly adjusted to accommodate the minimal thickness of the enclosure 28. Jointly with the shell 12, the container 36 has a robustness construction sufficient to withstand conditions typically encountered during transport by mail.

From the above, it can be appreciated that the packaging 10 can be adapted for shipping a wide assortment of cut flowers in a letterbox-type format (e.g., up to about 40×2000×450 mm). For example, flowers such as roses, tulips, carnations, etc., can be shipped in any assortment. In preliminary tests, roses of the varietals known as Happy Hour, Kiss, Trixx, and Sphinx were packaged without damage from the packaging process or during storage within the packaging 10.

While the invention has been described in terms of a preferred embodiment, it is apparent that other forms could be adopted by one skilled in the art. Therefore, the scope of the invention is to be limited only by the following claims.

The invention claimed is:

1. A system for packaging and delivering harvested plants, the system comprising:
   a transparent shell adapted for receiving a harvested plant, the transparent shell comprising a raised peripheral edge that surrounds and defines at least a first recess sized and configured for accommodating the harvested plant, the transparent shell having a profile in cross-section and an outline in plan view, the first recess having a profile in cross-section and an outline in plan view;
   a transparent enclosure sized and configured for enclosing the shell and the harvested plant, the transparent enclosure being formed from a perforated transparent foil wherein the perforated transparent foil is gas-impermeable except for perforations therein;
   a shipping container comprising a cavity that is sized and configured for accommodating the transparent enclosure with the shell and the harvested plant therein, the shipping container being at least sufficiently translucent to enable the harvested plant to be visible therethrough, the cavity having a cross-sectional size and shape corresponding to the profile of the transparent shell.

2. The system according to claim 1, wherein the profile of the transparent shell is substantially rectilinear and the profile of the first recess is substantially rectilinear.

3. The system according to claim 1, wherein the outline of the transparent shell is substantially rectilinear and the outline of the first recess is substantially rectilinear.

4. The system according to claim 1, wherein the transparent shell comprises at least a second recess surrounded and defined by the raised peripheral edge, the first and second recesses being substantially equal in size and shape.

5. The system according to claim 4, wherein the first and second recesses are separated and partially defined by a raised divider that is substantially equal in height to the raised peripheral edge.

6. The system according to claim 1, wherein the perforations are present in the perforated transparent foil in size and number to control oxygen content within the transparent enclosure.

7. system according to claim 1, wherein the shipping container has maximum dimensions of up to about 40×2000×450 mm.

8. The system according to claim 6, wherein the size and number of the perforations ensure an oxygen level of about 6 to about 10 volume percent within the transparent enclosure.

9. The system according to claim 8, wherein the size of the perforations is about 50 to about 250 micrometers in diameter and the number of the perforations is one to about fifty.

10. A system for packaging and delivering harvested plants, the system comprising:
    a transparent shell adapted for receiving a harvested plant, the transparent shell comprising a raised peripheral edge that surrounds and defines at least first and second recesses that are substantially equal in size and shape and are sized and configured for accommodating the harvested plant, the transparent shell having a profile in cross-section and an outline in plan view, the first recess having a profile in cross-section and an outline in plan view;
    a transparent enclosure sized and configured for enclosing the shell and the harvested plant, the transparent enclosure being formed from a perforated transparent foil;
    a shipping container comprising a cavity that is sized and configured for accommodating the transparent enclosure with the shell and the harvested plant therein, the shipping container being at least sufficiently translucent to enable the harvested plant to be visible therethrough, the cavity having a cross-sectional size and shape corresponding to the profile of the transparent shell.

11. The system according to claim 10, wherein the profile of the transparent shell is substantially rectilinear and the profile of each of the first and second recesses is substantially rectilinear.

12. The system according to claim 10, wherein the outline of the transparent shell is substantially rectilinear and the outline of each of the first and second recesses is substantially rectilinear.

13. The system according to claim 10, wherein the first and second recesses are separated and partially defined by a raised divider that is substantially equal in height to the raised peripheral edge.

14. The system according to claim 10, wherein the transparent foil comprises gas barrier means and means for inhibiting condensation within the enclosure.

15. The system according to claim 10, wherein the shipping container has maximum dimensions of up to about 40×2000× 450 mm.

16. The system according to claim 10, wherein the perforated transparent foil is gas-impermeable except for perforations therein.

17. The system according to claim 16, wherein the perforations are present in the perforated transparent foil in size and number to control oxygen content within the transparent enclosure.

18. The system according to claim 17, wherein the size and number of the perforations ensure an oxygen level of about 6 to about 10 volume percent within the transparent enclosure.

19. The system according to claim 18, wherein the size of the perforations is about 50 to about 250 micrometers in diameter and the number of the perforations is one to about fifty.

* * * * *